United States Patent
Brenes et al.

(10) Patent No.: US 10,404,762 B2
(45) Date of Patent: Sep. 3, 2019

(54) COMMUNICATION SYSTEM AND METHOD

(75) Inventors: Manrique Brenes, Corona del Mar, CA (US); Dmytro Izotov, London (GB); Derek MacDonald, Palo Alto, CA (US); Daniel Winston, London (GB)

(73) Assignee: SKYPE, Dublin (IE)

(*) Notice: Subject to any disclaimer, the term of this patent is extended or adjusted under 35 U.S.C. 154(b) by 607 days.

(21) Appl. No.: 13/340,524

(22) Filed: Dec. 29, 2011

(65) Prior Publication Data
US 2012/0182988 A1    Jul. 19, 2012

Related U.S. Application Data

(60) Provisional application No. 61/428,937, filed on Dec. 31, 2010.

(51) Int. Cl.
*H04L 29/06* (2006.01)
*H04L 12/18* (2006.01)
*H04L 12/58* (2006.01)

(52) U.S. Cl.
CPC ...... *H04L 65/1069* (2013.01); *H04L 12/1822* (2013.01); *H04L 51/04* (2013.01)

(58) Field of Classification Search
CPC ........... H04L 12/1822; H04L 29/06326; H04L 51/04; H04L 65/1069; H04L 12/581; H04L 29/08684; H04L 67/24; H04L 72/048
See application file for complete search history.

(56) References Cited

U.S. PATENT DOCUMENTS

| | | |
|---|---|---|
| 5,305,244 A | 4/1994 | Newman et al. |
| 6,061,434 A | 5/2000 | Corbett |
| 6,243,129 B1 | 6/2001 | Deierling |
| 6,321,080 B1 | 11/2001 | Diethorn |

(Continued)

FOREIGN PATENT DOCUMENTS

| | | |
|---|---|---|
| CN | 1694527 | 11/2005 |
| CN | 101039307 | 9/2007 |

(Continued)

OTHER PUBLICATIONS

"PCT Search Report and Written Opinion", Application No. PCT/EP2011/074302, (dated Mar. 6, 2012), 11 pages.

(Continued)

*Primary Examiner* — Khaled M Kassim
(74) *Attorney, Agent, or Firm* — Schwegman Lundberg & Woessner, P.A.

(57) ABSTRACT

There is provided a packet-based communication system for conducting voice or video calls over a packet-based network. A client application on a first terminal is configured to determine an availability of one or more other, second user terminals installed with other instances of the client application, and to present a near-end user with an option to select one of said second user terminals for use by the near-end user in conjunction with the first user terminal when conducting a voice or video call with a far-end user via the client instances and packet-based communication system; thereby enabling the voice or video call to be conducted using the second terminal to consume or generate at least one stream of the call whilst the first user terminal concurrently generates or consumes at least another stream of the call or controls the call.

19 Claims, 3 Drawing Sheets

(56) References Cited

U.S. PATENT DOCUMENTS

| | | |
|---|---|---|
| 6,449,284 B1 | 9/2002 | Hagirahim |
| 6,532,482 B1 | 3/2003 | Toyosato |
| 6,636,269 B1 | 10/2003 | Baldwin |
| 6,654,722 B1 | 11/2003 | Aldous et al. |
| 6,778,528 B1 | 8/2004 | Blair et al. |
| 6,904,025 B1 | 6/2005 | Madour et al. |
| 6,930,661 B2 | 8/2005 | Uchida et al. |
| 6,985,961 B1 | 1/2006 | Ramsayer et al. |
| 7,039,205 B1 | 5/2006 | Carter et al. |
| 7,260,186 B2 | 8/2007 | Zhu et al. |
| 7,301,919 B2 | 11/2007 | Sundquist et al. |
| 7,526,253 B2 | 4/2009 | Fujioka |
| 7,668,537 B2 | 2/2010 | De Vries |
| 7,673,001 B1 | 3/2010 | Battle et al. |
| 7,693,133 B2 | 4/2010 | Benco et al. |
| 7,747,010 B1 | 6/2010 | Rowe et al. |
| 7,751,848 B2 | 7/2010 | Vishwanathan et al. |
| 7,769,837 B2 | 8/2010 | Nogawa et al. |
| 7,908,630 B2 | 3/2011 | Crandall et al. |
| 7,920,690 B2 | 4/2011 | Sylvain |
| 7,995,721 B2 | 8/2011 | Gallick et al. |
| 8,090,780 B2 | 1/2012 | Hjelmeland Almas et al. |
| 8,223,747 B2 | 7/2012 | Yarlagadda et al. |
| 8,249,056 B2 | 8/2012 | Ku |
| 8,301,757 B2 | 10/2012 | Catlin et al. |
| 8,311,833 B2 | 11/2012 | Natesan |
| 8,352,260 B2 | 1/2013 | Sung |
| 8,369,498 B2 | 2/2013 | Dinka et al. |
| 8,407,749 B2 | 3/2013 | McLaughlin et al. |
| 8,413,199 B2 | 4/2013 | Laasik et al. |
| 8,421,839 B2 | 4/2013 | Kert |
| 8,451,315 B2 | 5/2013 | Lee |
| 8,520,050 B2 | 8/2013 | Blackburn et al. |
| 8,593,501 B1 | 11/2013 | Kjeldaas |
| 8,917,832 B2 | 12/2014 | Catlin et al. |
| 8,963,982 B2 | 2/2015 | MacDonald |
| 9,019,336 B2 | 4/2015 | Lindblom et al. |
| 9,398,164 B2 | 7/2016 | Gillett |
| 9,521,360 B2 | 12/2016 | MacDonald |
| 9,717,090 B2 | 7/2017 | Gillett et al. |
| 2002/0034166 A1 | 3/2002 | Barany et al. |
| 2002/0040377 A1 | 4/2002 | Newman et al. |
| 2003/0023730 A1 | 1/2003 | Wengrovitz et al. |
| 2003/0058805 A1 | 3/2003 | Meyerson et al. |
| 2003/0177099 A1 | 9/2003 | Gallant et al. |
| 2004/0083297 A1 | 4/2004 | Gazzetta et al. |
| 2004/0194146 A1 | 9/2004 | Bates et al. |
| 2005/0021872 A1 | 1/2005 | Poustchi et al. |
| 2005/0031092 A1* | 2/2005 | Umemura ............ H04N 7/142 |
| | | 379/88.13 |
| 2005/0034079 A1 | 2/2005 | Gunasekar et al. |
| 2005/0122963 A1 | 6/2005 | Jeon et al. |
| 2005/0193134 A1* | 9/2005 | Syrjala ............... H04L 29/06 |
| | | 709/230 |
| 2005/0197061 A1 | 9/2005 | Hundal |
| 2005/0268334 A1 | 12/2005 | Hesselink et al. |
| 2005/0278778 A1 | 12/2005 | D'Agostino et al. |
| 2006/0013194 A1 | 1/2006 | Baumann et al. |
| 2006/0026288 A1 | 2/2006 | Acharya et al. |
| 2006/0045070 A1 | 3/2006 | Fotta et al. |
| 2006/0143425 A1 | 6/2006 | Igarashi et al. |
| 2006/0149818 A1* | 7/2006 | Odell ................. G06Q 10/107 |
| | | 709/206 |
| 2006/0165050 A1* | 7/2006 | Erhart ............. H04L 29/06027 |
| | | 370/351 |
| 2006/0221174 A1 | 10/2006 | Yang et al. |
| 2007/0091833 A1 | 4/2007 | Bauchot et al. |
| 2007/0115348 A1 | 5/2007 | Eppel et al. |
| 2007/0120949 A1 | 5/2007 | Chuang |
| 2007/0223370 A1* | 9/2007 | Spear ............................ 370/218 |
| 2007/0244611 A1 | 10/2007 | Brozovich |
| 2007/0280200 A1 | 12/2007 | Patel |
| 2007/0286202 A1 | 12/2007 | Dos Remedios et al. |
| 2008/0032703 A1 | 2/2008 | Krumm et al. |
| 2008/0062940 A1 | 3/2008 | Othmer et al. |
| 2008/0062962 A1 | 3/2008 | Luck et al. |
| 2008/0069069 A1 | 3/2008 | Schessel et al. |
| 2008/0069087 A1 | 3/2008 | Igoe |
| 2008/0075240 A1 | 3/2008 | Ramanathan et al. |
| 2008/0081698 A1 | 4/2008 | Wormald et al. |
| 2008/0091682 A1 | 4/2008 | Lim |
| 2008/0094371 A1 | 4/2008 | Forstall et al. |
| 2008/0108348 A1* | 5/2008 | Kottilingal ............ H04W 28/18 |
| | | 455/435.1 |
| 2008/0114993 A1 | 5/2008 | Shankar et al. |
| 2008/0137642 A1* | 6/2008 | Teodosiu ............ H04M 3/4931 |
| | | 370/352 |
| 2008/0157998 A1 | 7/2008 | Zuo et al. |
| 2008/0177904 A1 | 7/2008 | Storey et al. |
| 2008/0182546 A1 | 7/2008 | Wang et al. |
| 2008/0195394 A1 | 8/2008 | Francioli |
| 2008/0235587 A1 | 9/2008 | Heie et al. |
| 2008/0238701 A1 | 10/2008 | Bickel et al. |
| 2008/0239995 A1 | 10/2008 | Lee et al. |
| 2009/0017792 A1 | 1/2009 | Matsumoto et al. |
| 2009/0034513 A1 | 2/2009 | McMullin |
| 2009/0046839 A1 | 2/2009 | Chow et al. |
| 2009/0049190 A1 | 2/2009 | Jiang et al. |
| 2009/0094684 A1 | 4/2009 | Chinnusamy et al. |
| 2009/0136016 A1 | 5/2009 | Gornoi et al. |
| 2009/0138697 A1 | 5/2009 | Kim et al. |
| 2009/0143053 A1* | 6/2009 | Levien .................... H04W 4/16 |
| | | 455/417 |
| 2009/0168756 A1 | 7/2009 | Kurapati et al. |
| 2009/0172170 A1 | 7/2009 | Rey |
| 2009/0175509 A1 | 7/2009 | Gonion et al. |
| 2009/0177601 A1 | 7/2009 | Huang et al. |
| 2009/0185792 A1 | 7/2009 | Braunstein et al. |
| 2009/0225750 A1 | 9/2009 | Hawkins |
| 2009/0232084 A1 | 9/2009 | Li et al. |
| 2009/0238170 A1 | 9/2009 | Rajan et al. |
| 2009/0280789 A1 | 11/2009 | Takumo et al. |
| 2009/0282130 A1 | 11/2009 | Antoniou et al. |
| 2009/0299735 A1 | 12/2009 | Bouvet et al. |
| 2010/0008523 A1 | 1/2010 | Demuynck et al. |
| 2010/0020729 A1 | 1/2010 | Walley et al. |
| 2010/0046731 A1 | 2/2010 | Gisby et al. |
| 2010/0056055 A1 | 3/2010 | Ketari |
| 2010/0060715 A1 | 3/2010 | Laasik et al. |
| 2010/0157013 A1* | 6/2010 | Sylvain ............... H04L 12/1827 |
| | | 348/14.01 |
| 2010/0216402 A1 | 8/2010 | Appleby et al. |
| 2010/0265312 A1 | 10/2010 | Choi et al. |
| 2011/0021200 A1* | 1/2011 | Yi et al. ......................... 455/442 |
| 2011/0047282 A1 | 2/2011 | Denman et al. |
| 2011/0110504 A1 | 5/2011 | Kaal et al. |
| 2011/0119490 A1 | 5/2011 | Kaal et al. |
| 2011/0141925 A1 | 6/2011 | Velenko et al. |
| 2011/0151892 A1 | 6/2011 | Vengroff et al. |
| 2011/0177801 A1 | 7/2011 | Heit et al. |
| 2011/0179180 A1 | 7/2011 | Schleifer et al. |
| 2011/0216671 A1 | 9/2011 | Walley et al. |
| 2011/0222466 A1* | 9/2011 | Pance et al. ................... 370/316 |
| 2011/0242266 A1 | 10/2011 | Blackburn et al. |
| 2011/0242268 A1 | 10/2011 | Kim et al. |
| 2011/0242270 A1* | 10/2011 | Dinka et al. ................. 348/14.11 |
| 2011/0243125 A1 | 10/2011 | Kaal et al. |
| 2011/0243140 A1 | 10/2011 | Blackburn et al. |
| 2011/0243141 A1* | 10/2011 | Blackburn et al. ........... 370/400 |
| 2011/0244955 A1* | 10/2011 | Dinka et al. ..................... 463/31 |
| 2011/0261143 A1 | 10/2011 | Ponsford |
| 2012/0062758 A1 | 3/2012 | Devine et al. |
| 2012/0066722 A1* | 3/2012 | Cheung ............... H04M 1/7253 |
| | | 725/62 |
| 2012/0081501 A1* | 4/2012 | Benzaia ................. H04N 7/147 |
| | | 348/14.04 |
| 2012/0081502 A1* | 4/2012 | Naidu .................... H04N 7/147 |
| | | 348/14.04 |
| 2012/0087367 A1 | 4/2012 | Anikin |
| 2012/0105475 A1 | 5/2012 | Tseng |
| 2012/0169831 A1 | 7/2012 | Nietfeld et al. |
| 2012/0173897 A1 | 7/2012 | Karkaria et al. |
| 2012/0176976 A1 | 7/2012 | Wells |
| 2012/0206553 A1 | 8/2012 | MacDonald |

(56) References Cited

U.S. PATENT DOCUMENTS

| | | | |
|---|---|---|---|
| 2012/0207147 | A1 | 8/2012 | MacDonald |
| 2012/0278454 | A1 | 11/2012 | Stewart et al. |
| 2013/0072173 | A1 | 3/2013 | Brady |
| 2013/0136089 | A1 | 4/2013 | Gillett |
| 2013/0106587 | A1 | 5/2013 | Reams |
| 2013/0169736 | A1 | 7/2013 | Lindblom |
| 2013/0230023 | A1* | 9/2013 | Gray et al. ............ 370/331 |
| 2014/0016608 | A1 | 1/2014 | Buer et al. |
| 2014/0073300 | A1 | 3/2014 | Leeder et al. |
| 2014/0112333 | A1* | 4/2014 | Oberle et al. ............ 370/352 |
| 2014/0122244 | A1 | 5/2014 | Arrasvuori et al. |
| 2014/0211666 | A1 | 7/2014 | Gillett |
| 2014/0218460 | A1 | 8/2014 | Benzaia et al. |
| 2015/0124042 | A1 | 5/2015 | MacDonald |
| 2016/0044574 | A1 | 2/2016 | Naqvi |

FOREIGN PATENT DOCUMENTS

| | | |
|---|---|---|
| CN | 101427557 | 5/2009 |
| CN | 102257791 | 11/2011 |
| EP | 1475939 | 11/2004 |
| EP | 1592198 | 11/2005 |
| EP | 1816843 | 8/2007 |
| EP | 1909467 | 4/2008 |
| EP | 2063612 | 5/2009 |
| EP | 2088735 | 8/2009 |
| EP | 2114062 | 11/2009 |
| EP | 2056601 | 8/2011 |
| GB | 2479180 | 10/2011 |
| JP | 200586765 | 3/2005 |
| WO | WO-2004066604 | 8/2004 |
| WO | WO-2005008524 | 1/2005 |
| WO | WO-2005009019 | 1/2005 |
| WO | 2005057969 A1 | 6/2005 |
| WO | WO-2006051492 | 5/2006 |
| WO | WO-2006058036 | 6/2006 |
| WO | WO-2007023208 | 3/2007 |
| WO | WO-2007137485 | 6/2007 |
| WO | WO-2007118250 | 10/2007 |
| WO | WO-2007126652 | 11/2007 |
| WO | WO-2008015369 | 2/2008 |
| WO | WO-2009115048 | 9/2009 |
| WO | WO-2010026187 | 3/2010 |
| WO | WO-2010026188 | 3/2010 |
| WO | WO-2010026189 | 3/2010 |
| WO | WO-2010026190 | 3/2010 |
| WO | WO-2010026191 | 3/2010 |
| WO | WO-2010026194 | 3/2010 |
| WO | WO-2010026196 | 3/2010 |
| WO | WO-2011120948 | 10/2011 |
| WO | WO-2011120991 | 10/2011 |
| WO | WO-2011120992 | 10/2011 |
| WO | WO-2011121006 | 10/2011 |

OTHER PUBLICATIONS

Saint-Andre, Peter "Streaming XML with Jabber/XMPP", IEEE Internet Computing, vol. 9, No. 5,(Sep. 1, 2005), pp. 82-89.

"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.

Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.

Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.

"PCT Search Report and Written Opinion", Application No. PCT/US2012/072025, (dated Mar. 26, 2013),12 pages.

"International Search Report and Written Opinion", Application No. PCT/EP2011/074303, (dated May 29, 2012), 11 pages.

"Bluetooth Profile", downloaded Jun. 28, 2010 from http:/ /en.wikipedia.org/w/index.php?title=Bluetooth_profile&oldid=330823199, accessed Dec. 10, 2009, (Dec. 10, 2009), 9 pages.

"Femtocell", downloaded Jun. 28, 2010 from http://en.wikipedia.org/w/iindex.php?title=Femtocell&oldid=330068819, accessed Dec. 10, 2009, (Dec. 6, 2009), 8 pages.

"Final Office Action", U.S. Appl. No. 12/843,543, (dated Aug. 3, 2012), 8 pages.

"International Search Report and Written Opinion", Application No. PCT/EP2011/054781, (dated May 23, 2011), 13 pages.

"International Search Report and Written Opinion", Application No. PCT/EP2011/054864, (dated May 31, 2011), 13 pages.

"International Search Report and Written Opinion", Application No. PCT/EP2011/054862, (dated Jun. 27, 2011), 17 pages.

"International Search Report and Written Opinion", Application No. PCT/EP2011/054881, (dated Jul. 25, 2011), 18 pages.

"International Search Report and Written Opinion", PCT Application PCT/EP2010/066562, (dated Feb. 23, 2011), 11 pages.

"International Search Report and Written Opinion", PCT Application PCT/EP2010/066561, (dated Sep. 26, 2011), 13 pages.

"International Search Report and Written Opinion", PCT Application PCT/EP2011/054879, (dated Jun. 24, 2011), 13 pages.

"International Search Report", Application No. PCT/EP2011/074304, (dated Feb. 7, 2012), 3 pages.

"IP-DECT", downloaded Jun. 28, 2010 from http://en.wikipedia.org/w/index.phptitle=IPDECT&oldid=322769463, accessed Dec. 10, 2009, (Oct. 29, 2009), 1 page.

"MagicJack Harnesses Femtocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.

"Non-Final Office Action", U.S. Appl. No. 12/290,232, (dated Jun. 11, 2012), 16 pages.

"Non-Final Office Action", U.S. Appl. No. 12/843,543, (dated May 29, 2012), 9 pages.

"Non-Final Office Action", U.S. Appl. No. 12/843,569, (dated Apr. 4, 2012), 13 pages.

"Search Report", Application No. GB1005462.5, (dated Jul. 28, 2011), 2 pages.

"Search Report", GB Application 0919591.8, (dated Feb. 23, 2011), 2 pages.

"Search Report", GB Application 0919592.6, (dated Feb. 24, 2011), 1 page.

"Non-Final Office Action", U.S. Appl. No. 13/340,508, dated Mar. 12, 2014, 9 pages.

"Extended European Search Report", EP Application No. 12199326.5, dated Apr. 3, 2013, 6 pages.

"Final Office Action", U.S. Appl. No. 13/340,508, dated Jun. 24, 2014, 7 pages.

"Foreign Notice of Allowance", EP Application No. 11808879.8, dated Aug. 20, 2014, 7 pages.

"Foreign Office Action", EP Application No. 11818918.2, dated Apr. 11, 2014, 6 pages.

"Non-Final Office Action", U.S. Appl. No. 13/340,492, dated Oct. 3, 2014, 14 pages.

"Non-Final Office Action", U.S. Appl. No. 13/710,041, dated Jul. 8, 2014, 11 pages.

"Non-Final Office Action", U.S. Appl. No. 13/752,298, dated Dec. 19, 2014, 28 pages.

"Notice of Allowance", U.S. Appl. No. 13/340,508, dated Sep. 30, 2014, 6 pages.

"Notice of Allowance", U.S. Appl. No. 13/710,041, dated Dec. 8, 2014, 4 pages.

"Foreign Office Action", CN Application No. 201180063604.5, dated Dec. 11, 2014, 16 pages.

"Foreign Office Action", CN Application No. 201210582330.7, dated Nov. 15, 2014, 16 pages.

"Supplemental Notice of Allowance", U.S. Appl. No. 13/340,508, dated Jan. 23, 2015, 2 pages.

"Final Office Action", U.S. Appl. No. 13/340,492, dated Jun. 19, 2015, 15 pages.

(56) References Cited

OTHER PUBLICATIONS

"Foreign Office Action", CN Application No. 201180063497.6, dated Jul. 3, 2015, 15 pages.
"Final Office Action", U.S. Appl. No. 13/752,298, dated Jun. 18, 2015, 27 pages.
"Foreign Office Action", CN Application No. 201180063514.6, dated Aug. 14, 2015, 7 pages.
"Foreign Office Action", CN Application No. 201180063604.5, dated Sep. 24, 2015, 13 pages.
"Non-Final Office Action", U.S. Appl. No. 13/752,298, dated Oct. 8, 2015, 27 pages.
"Non-Final Office Action", U.S. Appl. No. 14/596,156, dated Nov. 20, 2015, 11 pages.
"Foreign Office Action", CN Application No. 201180063514.6, dated Feb. 16, 2015, 15 pages.
"Final Office Action", U.S. Appl. No. 13/752,298, dated Apr. 5, 2016, 30 pages.
"Final Office Action", U.S. Appl. No. 14/596,156, dated Mar. 3, 2016, 11 pages.
"Foreign Notice of Allowance", CN Application No. 201180063604.5, dated Apr. 6, 2016, 8 pages.
"Foreign Office Action", CN Application No. 201180063497.6, dated Mar. 4, 2016, 10 pages.
"Foreign Office Action", CN Application No. 201180063514.6, dated Feb. 16, 2016, 7 pages.
"Foreign Office Action", EP Application No. 11818918.2, dated Jan. 22, 2016, 6 pages.
"Non-Final Office Action", U.S. Appl. No. 13/340,492, dated Jun. 16, 2016, 16 pages.
"Corrected Notice of Allowance", U.S. Appl. No. 14/596,156, dated Oct. 31, 2016, 2 pages.
"Final Office Action", U.S. Appl. No. 13/340,492, dated Dec. 29, 2016, 22 pages.
"Non-Final Office Action", U.S. Appl. No. 13/752,298, dated Oct. 19, 2016, 33 pages.
"Foreign Office Action", CN Application No. 201180063497.6, dated Jan. 11, 2017, 10 pages.
"Notice of Allowance", U.S. Appl. No. 13/752,298, dated Mar. 10, 2017, 8 pages.
"Advisory Action", U.S. Appl. No. 14/596,156, dated Jul. 11, 2016, 3 pages.
"Foreign Office Action", CN Application No. 201180063497.6, dated Jul. 21, 2016, 11 pages.
"Foreign Office Action", EP Application No. 11802455.3, dated Aug. 10, 2016, 4 pages.
"Notice of Allowance", U.S. Appl. No. 14/596,156, dated Aug. 4, 2016, 9 pages.
"Final Office Action Issued in U.S. Appl. No. 12/290,232", dated Dec. 6, 2012, 18 Pages.
"Non Final Office Action Issued in U.S. Appl. No. 12/824,681", dated Oct. 10, 2012, 14 Pages.
"Non Final Office Action Issued in U.S. Appl. No. 12/941,585", dated Dec. 31, 2012, 12 Pages.
"Final Office Action Issued in U.S. Appl. No. 13/789,500", dated Feb. 18, 2015, 25 Pages.
"Non Final Office Action Issued in U.S. Appl. No. 13/789,500", dated Jul. 9, 2015, 25 Pages.
"Non Final Office Action Issued in U.S. Appl. No. 13/789,500", dated Nov. 23, 2015, 26 Pages.
"Non Final Office Action Issued in U.S. Appl. No. 13/789,500", dated Sep. 25, 2014, 34 Pages.
David, et al., "A Location-Based Notification- and Visualization-System Indicating Social Activities", in Proceedings of Multimedia on Mobile Devices, vol. 7256, Jan. 28, 2009, 7 Pages.
"International Search Report and Written Opinion Issued in PCT Application No. PCT/US2014/013086", dated Jul. 24, 2014, 8 Pages.
"Second Written Opinion Issued in PCT Application No. PCT/US2014/013086", dated Jan. 28, 2015, 5 Pages.

* cited by examiner

COMMUNICATION SYSTEM AND METHOD

RELATED APPLICATION

This application claims the benefit of U.S. Provisional Application No. 61/428,937, filed on Dec. 31, 2010. The entire teachings of the above application are incorporated herein by reference.

TECHNICAL FIELD

The present invention relates to a communication system and a corresponding method for handling voice and/or video calls when multiple audio or video transducers or terminals are potentially available for use in the call.

BACKGROUND

Communication systems exist which allow a live voice and/or video call to be conducted between two or more end-user terminals over a packet-based network such as the Internet, using a packet-based protocol such as internet protocol (IP). This type of communication is sometimes referred to as "voice over IP" (VoIP) or "video over IP".

To use the communication system, each end user first installs a client application onto a memory of his or her user terminal such that the client application is arranged for execution on a processor of that terminal. To establish a call, one user (the caller) indicates a username of at least one other user (the callee) to the client application. When executed the client application can then control its respective terminal to access a database mapping usernames to IP addresses, and thus uses the indicated username to look up the IP address of the callee. The database may be implemented using either a server or a peer-to-peer (P2P) distributed database, or a combination of the two. Once the caller's client has retrieved the callee's IP address, it can then use the IP address to request establishment of a live voice and/or video stream between the caller and callee terminals via the Internet or other such packet-based network, thus establishing a call. An authentication procedure is typically also required, which may involve the user providing credentials via the client to be centrally authenticated by a server, and/or may involve the exchange of authentication certificates between the two or more users' client applications according to a P2P type authentication scheme.

In the simple case where each of the end users has only one client application installed on one terminal with only one microphone, one speaker, one webcam and one screen, then the handling of the call is relatively straightforward in this respect.

However, with the increasing prevalence of electronic devices capable of executing communication software, both around the home and in portable devices on the move, then it is possible that the same end user may have multiple instances of the same client application installed on different terminals, and/or that a user may have an instance of the client application installed on a terminal with multiple means of audio and/or video input and/or output, i.e. multiple audio or video transducers. In such cases it may be necessary to consider how to coordinate the operation of the multiple transducers and/or multiple terminals when making or receiving a call, or rather how to best exploit these multiple resources to improve the user's experience of the communication system.

The matter has been explored to some extent in some preceding patent applications: U.S. application Ser. No. 12/824,681, corresponding to Great Britain Application No. 1005386.6; U.S. application Ser. No. 12/843,527, corresponding to Great Britain Application No. 1005462.5; and U.S. application Ser. No. 12/941,585, corresponding to Great Britain Application No. 0919592.6.

Further, there are some existing arrangements that provide a remote interface for a call. For example Bluetooth headsets provide an input/output interface that is remote from the phone that handles the call. DECT phones (Digital Enhanced Cordless Telephones) provide handsets that are remote from the base station.

Nonetheless, the inventors believe there is scope to further improve the coordination between the operation of multiple audio or video transducers or terminals for the purpose of making or receiving packet-based calls.

SUMMARY

The present invention provides at least three different aspects, each relating to a communication system, terminal and client application. The communication system is a packet-based communication system such as the Internet and the terminal and client are arranged to conduct the calls via the packet based network using a suitable packet-based protocol such as internet protocol (IP).

According to a first aspect of the present invention, there is provided a communication system, terminal and/or client application configured to receive an input from multiple different audio and/or video input transducers of the same terminal, to analyze said inputs in relation to one another, and based on said analysis to select at least one audio and/or video input transducer and/or output transducer of that terminal for use in conducting a voice or video call.

According to a second aspect of the present invention, there is provided a communication system configured to receive an input from multiple different audio or video input transducers of different terminals of the same user, to analyze said inputs in relation to one another, and based on said analysis to select a suitable one of multiple instances of the client application running on the different terminals for use in conducting a voice or video call. The different instances may be logged in with the same user identity.

According to a third aspect of the present invention there is provided a first user terminal installed with an instance of a client application configured to determine an availability of one or more other secondary user terminals installed with other instances of the client application, and to present the user with an option to select one of said other secondary terminals for use in conducting a voice or video call in conjunction with the first terminal.

The first, second and third aspects of the invention may be used either independently or in combination.

According to the third aspect of the invention, there may be provided a method comprising: providing a packet-based communication system for conducting voice or video calls over a packet-based network; and providing an instance of a client application enabling a first user terminal to access the packet-based communication system, the client application being configured to determine an availability of one or more other, second user terminals installed with other instances of the client application, and to present a near-end user with an option to select one of said second user terminals for use by the near-end user in conjunction with the first user terminal when conducting a voice or video call with a far-end user via the client instances and packet-based communication system; thereby enabling the voice or video call to be conducted using the second terminal to consume or generate at least one stream of the call whilst the first user terminal concurrently generates or consumes at least another stream of the call or controls the call.

The voice or video call may be conducted using the second terminal to consume or generate at least one stream of the call whilst the first user terminal concurrently generates or consumes at least another stream of the call but not the stream consumed or generated by the first terminal, and/or the second user terminal may generate or consume a stream not consumed or generated by the second terminal.

The call may comprise a voice or video call. In embodiments, the method may enable the voice or video call to be conducted using the second terminal to play out or capture at least one audio or video stream of the call whilst the first user terminal concurrently plays out or captures at least another one of an audio or video stream of the call.

In further embodiments the voice or video call may be conducted using the second terminal to play out or capture at least one stream of the call whilst the call continues to be controlled by the client on the first terminal.

The control of said call by the client on the first terminal may comprise at least one of: terminating the call, controlling a volume of the call, and selecting a media input or output type or transducer for the call.

The first terminal may be the terminal used to initiate the call in the case of an outgoing call to the far-end user or the terminal used to answer the call in the case of an incoming call from the far-end user.

The method may comprise, at a later time, relinquishing control of the call to the second terminal in response to a selection by a user of the first terminal.

Said determination may comprise automatically discovering a respective identity of each of the one or more second user terminals.

Said determination may comprise automatically discovering a respective address of each of the one or more second user terminals.

Said determination may comprise automatically discovering a respective media capability of each of the one or more second user terminals.

Said determination may comprise automatically discovering a respective online status of each of the one or more second user terminals.

The method may comprise making said use of the second terminal in conjunction with the first user terminal conditional on an authorization procedure.

The first terminal may be a laptop or tablet computer and the second terminal may be a mobile handset.

According to another aspect of the invention there may be provided a terminal comprising one or more input and/or output devices and processing apparatus configured in accordance with any of the above features.

According to another aspect, there may be provided a computer program product comprising code embodied on a non-transient computer-readable medium and configured so as when executed on a processing apparatus to operate in accordance with any of the above features.

BRIEF DESCRIPTION OF THE DRAWINGS

For a better understanding of the present invention and to show how it may be put into effect, reference will be made by way of example to the accompanying drawings in which.

DETAILED DESCRIPTION

The teachings of all patents, published applications and references cited herein are incorporated by reference in their entirety.

Figure 1:
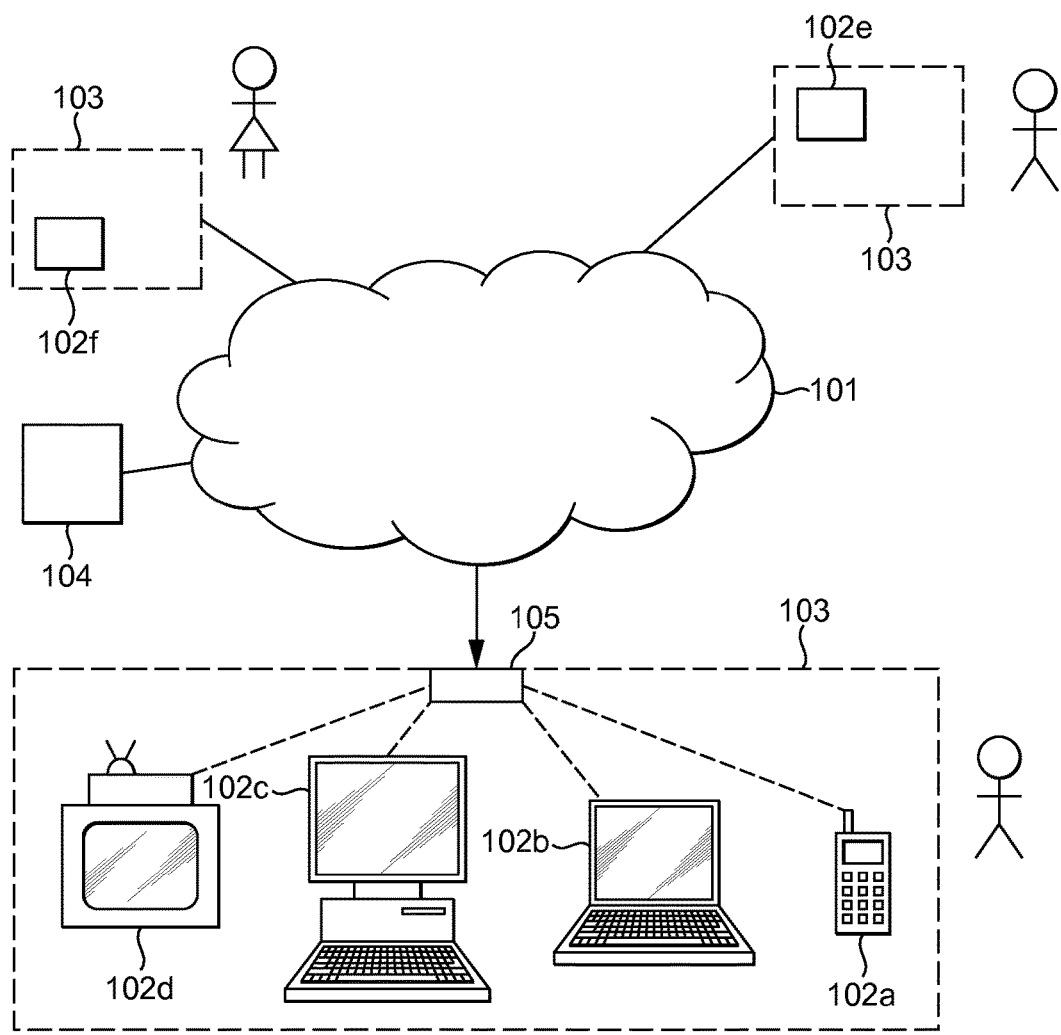
FIG. 1 is a schematic representation of a communication network.

FIG. 1 is a schematic diagram of a communication system implemented over a packet-based network such as the Internet 101. The communication system comprises respective end-user communication apparatus 103 for each of a plurality of users. The communication apparatus 103 of each user is connected to or communicable with the Internet 101 via a suitable transceiver such as a wired or wireless modem. Each communication apparatus 103 comprises at least one user terminal 102. Each terminal 102 is installed with an instance of the client application for accessing the communication system and thereby establishing a live packet-based voice or video call with the client of another user running on another such terminal 102.

Furthermore, in the case of at least one user of the communication system, that user's respective communication apparatus 103 comprises an arrangement or collection of multiple terminals 102. For example, in the illustrative embodiment of FIG. 1 the communication apparatus 103 of one user comprises: a mobile handset type terminal 102a such as a mobile phone, a laptop computer 102b, a desktop computer 102c, and a television set or television with set-top box 102d. Other types of terminal 102 that may be installed with a communication client include photo frames, tablets, car audio systems, printers, home control systems, cameras, or other such household appliances or end-user devices, etc. Each of the multiple terminals 102a-102d of the same user is installed with a respective instance of the communication client application which the same user may be logged into concurrently, i.e. so the same user may be logged into multiple instances of the same client application on two or more different terminals 102a-102d simultaneously. This will be discussed in more detail below.

Each of the different end-user terminals 102a-102d of the same user may be provided with individual connections to the internet 101 and packet-based communication system, and/or some or all of those different terminals 102a-102d may connect via a common router 105 and thus form a local network such as a household network. Either way, it envisaged that in certain preferred embodiments some or all of the different terminals 102a-102d of the same user will be located at different points around the house, e.g. with the television 102d in the living room, the desktop 102c in the study, the laptop 102b open in the kitchen, and the handheld 102a at any other location the user may happen to find themselves (e.g. garden or WC).

Also shown connected to the internet 101 is a data store 104 in the form of either a server, a distributed peer-to-peer database, or a combination of the two. A peer-to-peer database is distributed amongst a plurality of end-user terminals of a plurality of different users, typically including one or more users who are not actually participants of the call. However, this is not the only option and a central server can be used as an alternative or in addition. Either way, the data store 104 is connected so as to be accessible via the internet 101 to each of the client applications or instances of client applications running on each of the terminals 102 of each user's communication apparatus 103. The data store 104 is arranged to provide a mapping of usernames to IP addresses (or other such network addresses) so as to allow the client applications of different users to establish communication channels with one another over the Internet 101 (or other packet-based network) for the purpose of establishing voice or video calls, or indeed other types of communication such as instant messaging (IM) or voicemail.

In the case where the same user can be simultaneously logged in to multiple instances of the same client application on different terminals 102a-102d, in embodiments the data store 104 may be arranged to map the same username (user ID) to all of those multiple instances but also to map a separate sub-identifier (sub-ID) to each particular individual instance. Thus the communication system is capable of distinguishing between the different instances whilst still maintaining a consistent identity for the user within the communication system.

Figure 2:
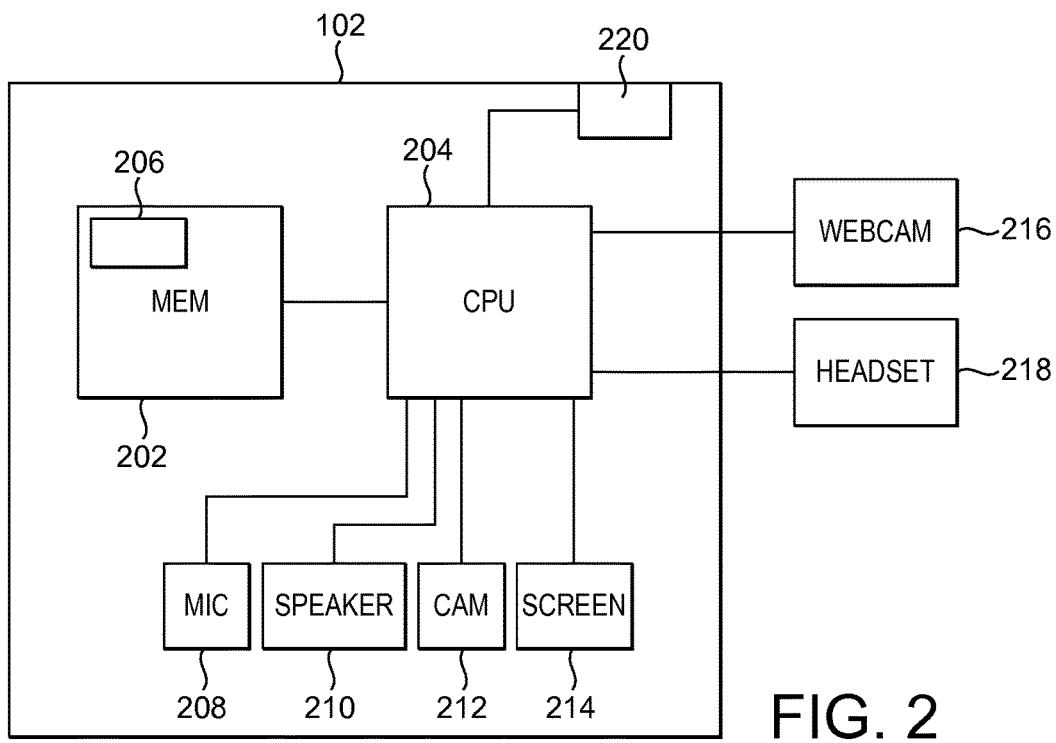
FIG. 2 is a schematic block diagram of a user terminal.
Figure 3:
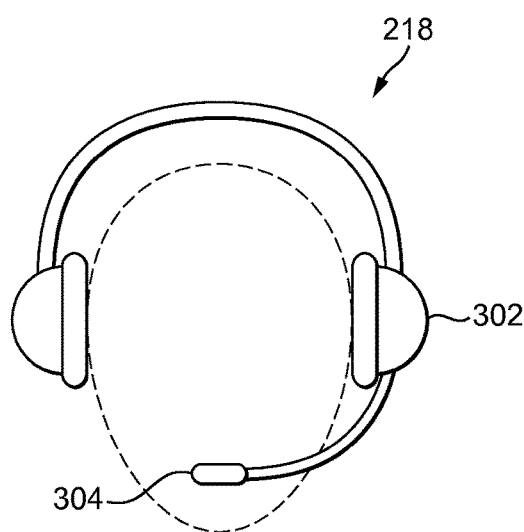
FIG. 3 is a schematic illustration of a headset.

FIG. 2 shows a schematic block diagram of an exemplary end-user terminal 102 according to embodiments of the present invention, which may correspond to any of those mentioned above. The user terminal 102 comprises a memory 202 such as an internal or external hard drive or flash memory, and a processing apparatus 204 in the form of a single or multi core processor. The memory 202 is installed with an instance of the communication client 206, is coupled to the processing apparatus 204, and is arranged such that the communication client 206 can be executed on the processing apparatus 204. The terminal 102 also comprises a transceiver 220 for communicating data on the up and downlink to and from the client 206 via the Internet 101 or other such packet-based network, e.g. a wireless transceiver for wirelessly connecting to the Internet 101 via the wireless router 105. The terminal 102 further comprises a plurality of AV transducers e.g. an internal microphone 104, an internal speaker 210, an internal camera 212 and a screen 214. The terminal 102 may then also comprise further AV transducers plugged into the main body of the terminal 102, e.g. an external or peripheral webcam 216 and a headset 218. As shown in FIG. 3 the headset 218 preferably comprises an earpiece or headphones 302 and microphone 304 integrated into the same unit.

The term AV transducer may be used herein to refer to any means of audio or video input or output. Terminal is meant as a discrete unit of user equipment whereas a transducer is a component or peripheral of a given terminal. In some situations such as that of a handset and docking station the categorization may not be immediately apparent, but for the purpose of this application a terminal is considered distinct if it executes its own instance of the communication client.

Each of the transducers 208-218 is operatively coupled to the processing apparatus 204 such that the client is able to receive input from any or all of the input transducers 208, 212, 216, 218 and supply outputs to any or all of the output transducers 210, 214, 218. The terminal of FIG. 2 is therefore notable in one respect in that it comprises multiple audio input transducers, multiple audio output transducers and/or multiple video input transducers, and that each of these is potentially available to the client application 206 for conducting voice or video calls over the packet-based network. Multiple video output transducers are also a possibility.

According to a first aspect of the present invention, the client application 206 is configured so as when executed to receive an input from multiple different input transducers of the same terminal 102, to analyze the input signals from the different input transducers in relation to one another, and based on the analysis to select a suitable input transducer and/or output transducer of that terminal for use in conducting a call.

According to a second aspect of the present invention, the instances of the client application 206 on the different terminals 102a-102d of the same user are configured so as when executed to operate in conjunction with one another, to thereby receive an input from input transducers of the different terminals 102a-102d, analyze the input signals from the different terminals 102a-102d in relation to one another, and select a suitable one of the multiple instances of the client application 206 running on different terminals 102a-102d for use in conducting a call. That is to say, the second aspect is concerned not just with the selection of a particular input or output transducer 208-218, but also with the routing of the voice and/or video stream of a call to and from a selected terminal 102a-102d. In this case the terminals 102a-102d together form one end of a call (the "near end") communicating with the client running on a further, third user terminal 102f (the "far end") via the Internet 101 or other such packet-based network.

In either case, the analysis applied to the inputs may include:
- a comparison of the energy or power level of the received audio signal from two or more audio input transducers from the same terminal 102 and/or from different terminals 102;
- comparison of a Fourier analysis of the input signal received from two or more different audio or video inputs from the same terminal and/or different terminals;
- a voice recognition algorithm applied to the received audio signal from two or more audio input transducers from the same terminal 102 and/or from different terminals 102;
- a facial recognition algorithm applied to the received video signal from two or more video input transducers from the same terminal 102 and/or from different terminals 102; and/or
- a motion recognition algorithm applied to the received video signal from two or more video input transducers from the same terminal 102 and/or from different terminals 102.

The client application 206 is arranged to perform one or more such analysis processes and, based on the said analysis, to select one or more of the following for use in conducting the packet-based voice or video call: an input audio transducer, an input video transducer, an output audio transducer, an output video transducer, and/or an instance of the client application running on one of multiple terminals of the same user. This process may be performed upon making a call, answering a call, and/or dynamically during an ongoing call.

For example, in one embodiment the invention may advantageously be used in conjunction with a client 206 or terminal 102 capable of recognizing voice activated commands, e.g. so that the user can control the client 206 vocally with commands such as "call . . . ", "answer call", and "hang up". Depending on the approximate location of a user within a room, or depending on whether or not the user is wearing his or her headset 218, then the optimal microphone for use in making or answering a call may vary. The client 206 may therefore analyze the inputs from two or more microphones 208, 304 of the same terminal in the same room to determine which input signal has the largest energy in the human vocal frequency range, e.g. when the user speaks to answer the call using a voice command, and then select that microphone to use in the call.

The audio inputs from the microphones may also determine a suitable audio output transducer, e.g. by selecting between a loudspeaker 210 and the headphones 302 of a headset 218 depending on which microphone is generating the most vocal energy.

In another example, detection of a rustling or scrabbling sound at the headset microphone 304 may be taken as indicative of the user fumbling for their headset to answer an incoming call, and this can be used to select the headset 218 for audio input and/or output.

In yet another embodiment, the audio inputs from the microphones may be used to switch between different audio or video output transducers during the call, e.g. if the user moves around the room or puts on or removes the headset In an example of the second aspect of the invention, it is envisaged that the invention will have an application in situations where the user has different terminals 102a, 102b, etc. located in different places around the house. In this case an analysis of the energy levels from different microphones or cameras of different terminals may be used to determine the presence of the user in a particular room or the proximity to a particular terminal, and hence determine the best terminal for answering or making a call, or to switch between the terminals during an ongoing call as the user roams about the house. Other techniques that can be used to detect the presence or proximity of a particular user include motion estimation to detect the presence of a suitably sized moving object (which may be taken as a human moving between rooms), a Fourier analysis to determine an overall color property of an image or moving object (e.g. based on the assumption that the moving user wears the same color clothes as they move between rooms), or a voice or facial recognition algorithm (to help distinguish between multiple people and/or background noise), or indeed any combination of these.

In the case of the second aspect of the invention, it will be necessary for the client instance 206 on at least one of the terminals to send information about the input received from its respective transducer(s) to one or more other terminals or other network elements for comparison. To achieve this, both (or all) of the user's client instances 206 that are involved in the comparison are preferably logged into with the same username and have the concept of being in the same call.

For example, communication between the instances and/or controller may be enabled by reference to the system of user IDs and sub-IDs mapped to IP addresses or other such network addresses by the data store 104. Thus the list of sub-IDs for each user allows the different client instances to be identified, and the mapping allows a client instance, server or other network element to determine the address of each terminal on which one or more other different instances is running. In this manner it is possible to establish communications between one client and another or between the client and a server or other network element for the purpose of sharing information on the input signals from the audio and/or video input transducers, e.g. to share input energy levels, motion vectors or FFT results. The same mechanism may also be used to signal or negotiate the selection of the required instance for conducting the call.

Alternatively, communication set up may be enabled by maintaining a list of only the terminal identities rather than the corresponding client identities, the list being maintained on an accessible network element for the purpose of address look-up. For example a list of all the different terminals 102a-102d may be maintained on an element of the local home network, 105, 102a-102d, in which case only the local network addresses and terminal identities need be maintained in the list, and a system of IDs and separate sub-IDs would then not necessarily be required. The local list could be stored at each terminal 102a-102d or on a local server of the home network (not shown), and each client instance would be arranged to determine the necessary identities and addresses of the other instances' terminals by accessing the list over the local network.

Once a suitable mechanism has been put in place for identifying the different client instances and the addresses of their respective terminals 102a-102d, the selection may be performed in a number of ways. For example, in one implementation all of the client instances 206 in question may be arranged to transmit their respective transducer input information (e.g. input energy levels, motion vectors or an FFT result) to a central server or other central control element, which could be implemented on a server along with the data store 104 or on an element of the local home network. The central controller would then be arranged to run an algorithm to analyze the different received inputs in relation to one another and thereby select the instance of a particular terminal, e.g. 102b, to make or answer the call. The controller then instructs the instances 206 on their behavior (are they involved in the call or not and to what extent) using the chosen signaling mechanism. In another implementation, the different client instances 206 may share the information directly between each other and either mutually negotiate the selected terminal according to some predetermined protocol or act under the control of one instance that has been designated as the master instance (e.g. by the user or by default).

As mentioned, in some embodiments the analysis of the transducer inputs may be used to switch between different instances of the client 206 running on different terminals 102a, 102b of the same user during an ongoing call, e.g. as the user walks between rooms (rather than just selecting an instance to initiate an outgoing call or answer an incoming call). This may involve each client instance 206 periodically sampling or otherwise monitoring its respective input transducer or transducers 208, 212, 218 and sharing the monitored information throughout the call in a similar manner to that described above. Alternatively each client may only share new transducer input information in response to some detected event such as the input energy level or motion vector exceeding some threshold. Either way, the controller or master instance may thus apply the selection algorithm to the received input information at multiple times throughout the call, in either a scheduled or event-based manner, in order to make an ongoing, dynamic selection as to which instance 206 on which terminal 102 should be used for the call.

In one implementation of the dynamic switching case, once the desired instance has been identified as the selected endpoint for the call, then the switchover may be completed in a similar manner to known call forwarding techniques as described for example in U.S. application Ser. No. 12/290,232 (U.S. Patent Application Publication No. US 2009-0136016), but with the call being transferred between different terminals of the same user based on different sub-IDs, rather than the call being transferred between different users based on different user IDs. In another implementation, the client 206 on the initial terminal, e.g. 102b, may continue to receive the audio and/or video stream of the call but then route the audio and/or video stream onwards to the newly selected terminal, e.g. 102c (such that the endpoint of the call appears to be the same, 102b, from the perspective of the client on the other end of the call). This latter option would be particularly applicable if the initial and new terminals 102*b* and 102*c* have a local wireless connection such as a wi-fi or Bluetooth connection available between them.

In both the first and second aspects of the invention, note that the type of transducer being selected is not necessarily the same as the type of transducer used to make the selection. For example, a microphone may indicate the presence of a user in a particular room or location and be used to select a suitably located camera, or a camera may indicate the presence of a user in a particular room or location and be used to select a suitably located microphone, etc.

Further, it is not necessarily the case that the voice and video streams are routed to and from the same user terminals 102*a*, 120*b*, etc. In embodiments it could be possible to determine that, say, a television 102*d* is best placed to display video to the user whilst a laptop 102*b* or mobile terminal 102*a* is best placed to handle the audio part of the call. The selection algorithm running on the client instance 206 and/or central controller would then instruct the two streams to be routed to different terminals 102*a*, 102*b*.

The first and second aspects of the invention may be used either independently or in combination. For example, it would be possible for the instance of the client application 206 running on each of multiple terminals 102 to determine its own best local input transducer (e.g. highest audio input energy level or best Fourier analysis match), then for the different instances to compare their best local input results to find the best global input result.

In either case, an initial calibration phase may be useful, e.g. to determine the relative levels that the different microphones generate when the user is at different distance from those microphones. That is to say, the client 206 is preferably configured to determine the relative gains of the different microphones. For example upon initial installation the user may be asked to sit or stand at two or more predetermined distances from the terminal and speak at a fixed level, which the client 206 can then use for calibration.

In absence of a clear determination in any of the above examples, the client or system may be configured to use a default transducer and/or terminal for making or answering calls.

According to a third aspect of the present invention, a primary terminal 102 running an instance of the communication client 206 is able to select the resources of one or more secondary terminals 102 installed with or running another instance of the client 206 to be used during a conversation. The user may use the terminal 102 that provides the best interfaces for what they are doing. For example if the user is participating in a video call, he may use his TV 102*d* for receiving and transmitting video, while using a mobile device 102*a* for controlling the call and transmitting and receiving the audio stream. Similarly if he wanted to maintain a conversation while working in his living room he may direct the call to a stereo system or speaker phone while he sends/receives video from a handheld or portable device like a photo-frame, he may even chose to send/receive a data file going directly from/to his NAS (network attached storage device). Alternatively he may direct all media to the secondary terminal but just retain control of the call from the primary terminal. Either way, the control of the call may comprise for example initiating a call, changing options within a call such as volume, toggling the use of the secondary terminal in the call on or off, selecting between secondary terminals for use in the call, or terminating a call ("hanging up").

The term "consume" may be used generally to mean playing a live audio or video stream or storing a file transfer, i.e. using the stream for its ultimate purpose at its end-point destination. Similarly the term "generate" may refer to capturing a live audio or video stream or retrieving a file transfer from memory for transmission over a network, i.e. at the origin of the stream. The third aspect of the invention can be used to allow the second terminal to consume or generate at least one stream of the call whilst the first user terminal concurrently generates or consumes at least another stream of the call. Preferably the different terminals handle the different streams exclusively of one another, e.g. generating or capturing video only at the secondary terminal and not the primary terminal whilst generating or capturing audio only at the primary terminal and not the secondary terminal, or other such combinations. In alternative embodiments one of the streams may be a file transfer performed in conjunction with the voice or video call as part of the same session between the same near and far end users, or in embodiments the call may even comprise only a file transfer. In other embodiments only live voice and/or video streams may be involved, e.g. with one terminal capturing the outgoing video stream and another terminal playing the incoming video stream, and/or with different terminals handling audio and video streams.

In one example, the client instances could be "network aware" and could be provided with an API enabled to facilitate not only the discovery of the different devices but also the easy transfer/usage of different media streams in a conversation from one end point to the next or the combination of two end points. This allows a user to configure how multi device resources should be allocated for handling communication events.

The client application running on a user terminal 102 is configured to determine an availability of one or more other, second user terminals installed with other instances of the client application. That is to say, does not just detect the existence of a particular kind of physical device or link, but rather the client is configured to detect the existence of other instances of the same communication client installed on other user terminals 102 (whether an identical instance or an instance of a compatible version of the communication client). E.g. the client does not just detect a wi-fi or Bluetooth device but also detects that the device has a suitable instance of the same communication client. Thus the clients are able to detect one another on the network, e.g. by announcing themselves over a network such as the local network 103 or wider network 101. Example details of some suitable discovery mechanisms will be described later.

This third aspect of the present invention advantageously allows a user to be presented with a list of available user terminals 102 and to select at least one secondary terminal 102 with the most appropriate capabilities to handle part of the call or a particular type of communication, for example a live video stream or file transfer. According to an embodiment of the invention, a terminal 102 such as a mobile phone 102*a* installed with an instance of the client application 206 is arranged to discover other resources that are available on other such user terminals 102. The primary user terminal may detect proximity of the one or more potential secondary terminals based the existence of one or more other instance of the client operating within the same network, e.g. same local network such as a wireless home network 103. The user may then select to use the resources of one or more of the discovered terminals 102.

The selection of "resources" could refer to selecting a particular other (secondary) user terminal 102, or selecting a particular audio or video output transducer 208-218 of a particular other user terminal 102.

The terminal 102 that is used by a user to perform the selection will be referred to as a primary terminal. Each selected terminal will be referred to as the secondary terminal. In the case of an outgoing call the primary terminal is preferably the initiator of a call, and in the case of an incoming call the primary terminal is preferably the terminal used to answer the call. The primary terminal is also preferably the terminal which controls the call, e.g. to choose when to terminate the call or activate other features. The primary terminal may remain the master terminal for the purpose of controlling the call, or primary status could be transferred during the call to another terminal such as one of the secondary terminals.

A similar terminology may be used to describe the primary and secondary clients running on the primary and secondary terminals respectively.

According to the third aspect of the invention, the client 206 on the other (secondary) user terminal such as 102c may be of the same user as that on the primary terminal (i.e. logged in with the same user ID), or may be another terminal 102e borrowed from a different user (logged in with a different user ID). Either way, the primary and secondary terminals 102a-102e together form one end of the call (the "near end") communicating with the client running on a further, third user terminal 102f (the "far end") via the Internet 101 or other such packet-based network.

In order for one client instance 206 to use the resources of another client instance 206 it is desirable to require the primary client instance to be authorized to use the resources of the other client instance. There are different methods by which one client instance 206 can authorize another client instance, as follows.

One method is for instances of the client 206 that are logged on with the same username may be automatically authorized to share resources, e.g. the clients on terminals 102b and 102a.

In another authorization method, if the terminals 102 are logged on using different usernames, it may be necessary for the client on one terminal such as 102b to authorize the client of another terminal 102e to use resources. This may be configured locally at the terminal 102, for example the user may input the usernames of authorized clients 206, or select contacts from the contact list that are authorized to use the terminal resources. Alternatively this may be configured remotely, for example a primary client may send an authorization request to a secondary client to allow the primary client to use the resources of the secondary client.

Alternatively a client 206 may be configured to authorize any contact to use the resources of the terminal 102—i.e. any contact that has been approved by the user to be included in a contact list.

In another alternative, the client 206 on the primary terminal 102b generates a PIN code which the user must then enter into the client 206 on the secondary terminal 102a or 102e. The client on the secondary terminal 102a or 102e then transmits the PIN back to the client on the primary terminal 102b and, on condition that the PIN is correct (matches), the client on the primary terminal then authorizes the secondary terminal.

As such the primary terminal 102b that initiates a VoIP conversation will have the capability to direct any media stream to any of the secondary terminal that is authorized to use. The media stream of the conversation will be directed to the designated secondary terminal 102e that the primary user selects. The primary user may choose to move all the media streams to a terminal and/or designate an alternative terminal as the primary terminal.

Each client 206 that can act as a primary client, e.g. on primary terminal 102b, is preferably configured with a mechanism for resource discovery for discovering the presence of other potential secondary terminals 102a, 102e, etc. and/or for discovering the media capability of the potential secondary terminals (what input and output transducers they have available). E.g. this may be achieved by detecting which other terminals are connected to the same local network and installed with an instance of the client. Resources available to the primary client are then presented in a list. The list of available resources may indicate the terminal type (e.g. TV, printer) such that the user can select the most appropriate device to handle the communication event. For example the user may select a TV for a video call, a stereo system for a voice call, or a Network Attached Storage (NAS) device for a file transfer.

The available resources of other terminals installed with instances of the client 206 may be discovered using a number of alternative methods, for example as follows. A user terminal 102 installed with a suitable client application 206 or suitable instance of the client application may be referred to in the following as an "enabled terminal".

One such method is server assisted resource discovery. In one embodiment of the invention a server stores the location of each terminal having an instance of the client 206. When a user logs in, the client is arranged to provide its location and terminal type/capabilities to the server. The location could be defined as IP address, NAT or postal address input by the user. In this embodiment of the invention the server is arranged to return a list of proximate terminals to that of the primary client in response to the primary client transmitting a find suitable terminals to the server.

Alternatively the server may provide a client 206 with a list of available terminals 102 enabled with the client 206 in response to receiving a configuration message from a client 206. In this case a client may provide a list of one or more usernames that are authorized to use the resources of the device on which the client is installed. The user of the device may configure access to be limited to certain types of resource, e.g. audio output only, and may additionally control the times during which the resource may be accessed. The server is arranged to provide each authorized client in the list with a message indicating which resources the client is authorized to use and when.

In either of the above options the server could instead be replaced with a distributed database for maintaining the list, or a combination of the two may be used. In the case where the primary and secondary terminals are of the same user, i.e. running clients logged in with the same username, the system of usernames and sub-identifiers may be used to distinguish between the different instances in a similar manner to that discussed above. However, that is not essential and instead other means of listing the available terminals could be used, e.g. by listing only the terminal identity rather than the corresponding client identity, or in the case where the primary and secondary terminals are of different users (e.g. 102b and 102e) then the sub-identifier would not necessarily be needed.

Another possible method is common local network device discovery. In an alternative embodiment the primary client is arranged to present a list of terminals 102a, 102c, 102d enabled with the client 206 to the user that are discovered on the local network, this may be in response to the user actuating a find 'Enabled Terminals' instruction or in response to the user connecting to the network. Any IP enabled terminal that registers into a given network receives a unique IP address within that network. As an enabled terminal joins it will broadcast a presence message to all enabled terminals in that network announcing a given username/ID and a list of authorized users that have rights to access its capabilities. All the enabled terminals 102 that receive this message and have a common authorized user will reply back to authenticate themselves and establish a secure communication channel through which they will announce its IP address and available resources to the primary user. The primary user will have rights to access the media interfaces of all the enabled terminals for which it has been authenticated.

Another method is to select resources from the contact list (i.e. a list of contacts approved by the user for communicating with that user, typically maintained via the user's own client 206). In this case resources of other terminals such as 102e may be indicted on the user's contact list. For example each contact listed in the contact list will indicate the type of terminal 102 on which the client is executed. This may be determined automatically, for example the client 206 may detect the type of device by detection of the operating system. Alternatively the user may input the device type directly. The device type may be presented in the contact list in the form of the contact name, 'John's TV', the mood messages, or an icon.

In both the second as well as the third aspects of the invention, the online status of the other or secondary client application may be relevant, e.g. on other user terminal 102a, 102c or 102e.

In order for the resources of another or secondary terminal 102 to be accessed, it will likely be necessary for the device to be online at the time the communication event is received. If the secondary terminal is not online the primary client should preferably be prevented from selecting the resources of the offline secondary device.

The availability of resources may be determined using the presence. In this case the client applications 206 are arranged to search for contacts' network addresses in a peer-to-peer network or server. Once the address is determined the client 206 sends a status request command to the specified address. If the contact is online, it responds with a reply reporting its status. If no reply is received, the contact is deemed to be offline. Presence requests are preferably sent periodically so that the status can be updated when necessary.

In an alternative embodiment, in the case where the secondary terminals 102 are located on the same local network, each client 206 is arranged to transmit "keep alive" messages periodically. If a keep alive message is not received from a client, the client is determined to be offline.

A further matter which may be relevant to the third embodiment is the primary and secondary client status.

When a client is selected as a secondary client, the identity of the primary client is stored at the secondary device. The client will behave as a secondary client for any calls or communication events associated with the primary client.

For example, in response to receiving a selection request at the secondary terminal, the secondary client will store the network location/username of the primary terminal. The secondary client will handle media and call set up instructions from the primary client in accordance with predetermined rules configurable by the user. For example the user may configure the TV client to allow the mobile client to use the video input and output resources of the TV. If the TV receives a call set up request from a third party that identifies the mobile client as the primary client, the TV will only handle the video media during the call. In particular the TV client will not attempt to capture and transmit audio during the call. Furthermore the TV will not display a user interface to the user for controlling the call.

The above embodiments provide example mechanisms by which one or more user terminals can be selected for use in conducting a call or part of a call according to the second or third aspects of the invention. Once a suitable mechanism is put in place, call or communication set up can proceed as follows. By way of example, the following will be described with reference to the laptop or tablet style computer 102b as the primary terminal and the mobile handset type terminal 102a as the secondary terminal.

When a call is received at the primary terminal 102b, the client running on the primary client may be used to answer the call and direct the media stream to the desired selected secondary terminal 102a. Note that the audio and video streams of a video call are not necessarily generated or played out by the same user terminal 102, and nor are the received and outbound streams necessarily generated and played by the same terminal 102. Indeed, it is one advantageous use of the present invention that the primary terminal 102b can be used to generate and/or play out the audio stream whilst the secondary terminal 102a is used to generate and/or play out the video stream, or vice versa—i.e. the second terminal 102a handles whichever of the received and/or outbound audio and/or video streams is not handled by the primary terminal 102b. Other streams such as file transfers forming part of the same session as the call may also be directed to a secondary terminal, e.g. 102c or 102e.

In a preferred embodiment of the invention, the primary client on the primary terminal 102b may instruct the far end party (on the other end of the call) to route the relevant media stream directly to the secondary client on the secondary terminal 102a (e.g. by referring the far end terminal to the mapping of user IDs and Sub-IDs to addresses in the data store 104, or by sending the address of the secondary terminal 102a to the far end terminal directly). Alternatively however all streams may be routed via the primary terminal 102b, with the primary client then routing any required streams onwards to and from the secondary terminal 102a (i.e. so from the perspective of the far end client and user terminal the primary terminal 102b is still the end point for all streams of the call, and the routing to or from the secondary terminal is handled solely by the client on the primary terminal 102b).

In order to retain control of the call at the primary device, the secondary client will handle the call in response to instructions received from the primary client (e.g. end call). In one example these instructions may be sent as IM messages. The primary terminal may input call handling instructions such as 'increase volume', 'answer call', 'turn off webcam' or 'end call' using predetermined IM messages, recognized by the secondary client.

In an alternative embodiment of the invention, call set up may be handled by the server. For example if the user has previously configured the system to send video to the television, the server will provide the address of the TV to the far end node such that video data can be sent directly to the TV client. Again the TV client will be aware that the call is associated with the primary device and will accordingly only use the resources that are authorized for use.

Either way, in order to direct control signals to instruct the secondary terminal, the primary client or the server may determine the address of the secondary terminal from a list or database mapping addresses to terminal identities or user IDs and Sub-IDs, which may be implemented on a server, distributed database or local network element. In embodiments the mechanism for transmitting control signals and/or responses in the third aspect of the invention may be the same or a similar mechanism to that used to share information on transducer inputs according to the second aspect of the present invention, or in other embodiments different mechanisms may be used for the two different aspects.

Note that in preferred embodiments a client 206 installed at any terminal 102 may present the user with a list of enabled terminals 102 which are installed with an instance of the client application 206. In this case the terminal on which the user selects a terminal becomes the primary terminal and the selected terminal becomes the secondary device.

The behavior of a client 206 as either a primary client or a secondary client will depend on whether it has been selected for use as a secondary client.

An example use of the third aspect of the present invention is now described with reference to FIG. 4. This advantageously adds the option of a remote camera as a feature of a VoIP video call, allowing a user to use his or her mobile terminal 102a as an 'off-board' camera. While in a video call on a device such as a TV, desktop computer or similar, the user will have the ability to switch to using their mobile phone's camera to move around their environment and show the person they are calling their surroundings. This functionality can also bring video calling capability to users' who do not have a web cam connected to their computer/laptop 102b etc.

Figure 4:
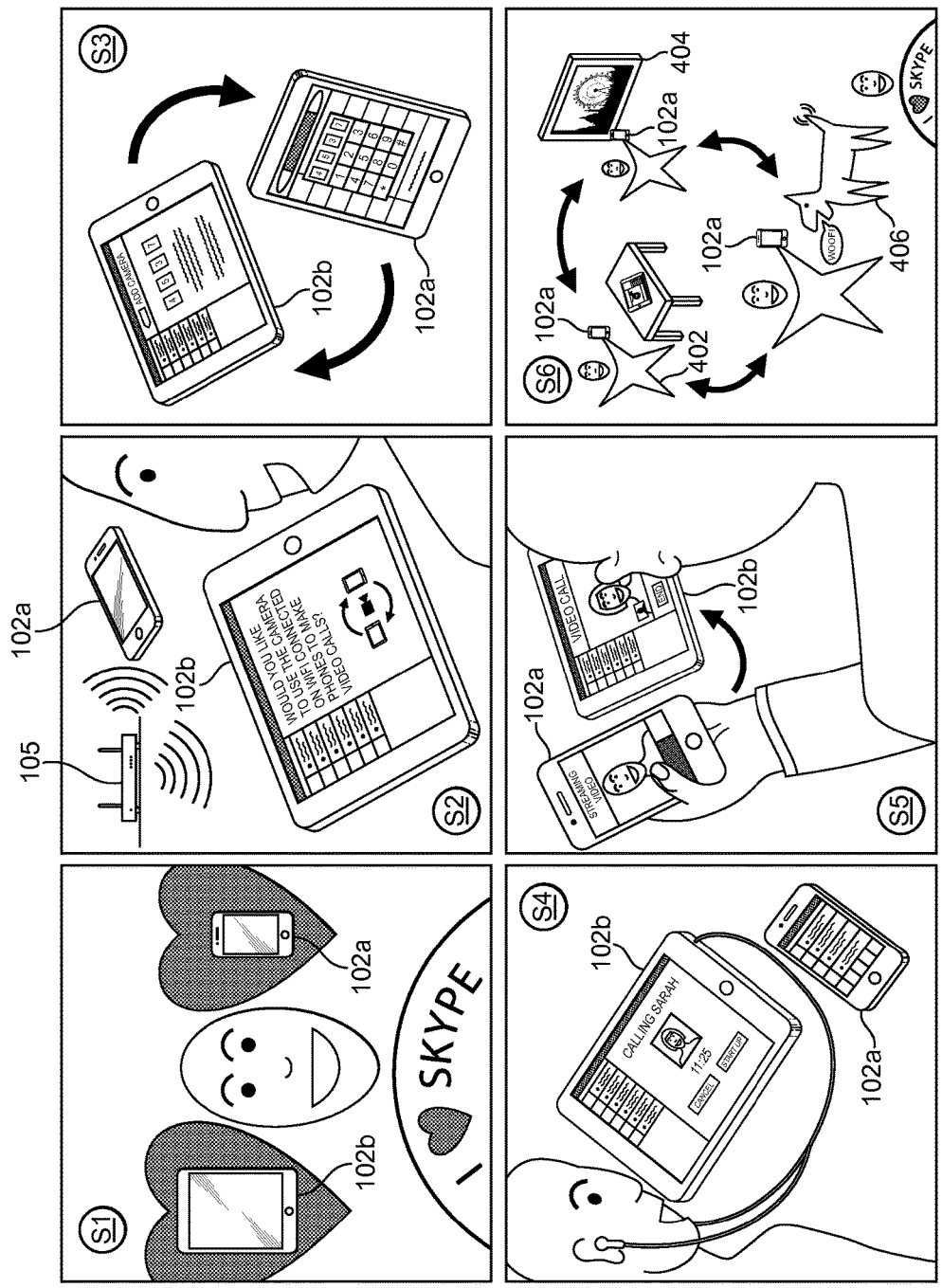
FIG. 4 illustrates a method according to one exemplary use of the invention.

Referring to FIG. 4, at step S1 a user "Dave" begins with a user apparatus 103 comprising a laptop or tablet type computer 102b and a mobile handset type terminal 102a, each installed with an instance of a VoIP client 206 for performing voice and video calls. As shown under step S2, both devices are connected to a wireless home network via a suitable transceiver 220 and wireless router 105, e.g. wi-fi.

In this example Dave has selected the tablet computer 102b as his primary terminal. At step S2 the client 206 running on the primary terminal 102b detects the presence of a potential secondary terminal 102a on the local network (in this case a mobile terminal 102a) and prompts him with an on-screen message asking whether he would like to link the devices so as to use the camera on his mobile terminal 102a to capture video for the purpose of video calls (alternatively Dave may summon this option himself). For the sake of example, Dave chooses "yes".

At step S3 the client 206 on the primary terminal initiates an authorization procedure to authorize the mobile 102a for use as a secondary terminal. In the illustrated example the authorization procedure used comprises the PIN code method mentioned above, whereby the client on the primary terminal 102b generates a PIN code which the user must then enter into the client 206 on the secondary terminal 102a or 102e, and the client on the secondary terminal 102a or 102e then transmits the PIN back to the client on the primary terminal 102b to demonstrate that it matches and thereby obtain the required authorization. However, in other embodiments other authorization techniques could be used, either as an alternative or in conjunction with the PIN code method.

At step S4, Dave answers an incoming video call or initiates an outgoing video call with a remoter user "Sarah" using the primary terminal 102b. At this stage the client 206 on the primary terminal 102b may prompt him again to check he would like to use the secondary terminal to capture video in this particular call (or possibly other options such as using a TV 102c to play out video, or use the mobile terminal 102a to capture voice, etc.) Again for the sake of the example, in this case Dave selects "yes".

At step S5 the call begins This includes the client on the secondary terminal 102a streaming the captured video via the local wireless network or other wireless connection network to the primary terminal 102b, whilst the primary terminal 102b captures the audio signal. The incoming audio and video streams are received at the client on the primary terminal 102b, and in this example also played out from the primary terminal 102b. However, other divisions between the primary and secondary terminals of the functions of capturing and/or playing out of the audio and/or video streams are also possible. Other routing options are also possible, e.g. by the example discussed above whereby the client on the primary terminal 102b instructs the remote user's terminal 102 to set up a separate channel with the secondary terminal so as to route one of the streams directly to or from the secondary terminal 102a in parallel with the primary terminal 102b.

As shown at step S6, using the described set up, Dave can then direct the camera on his mobile terminal 102a so as to share video with Sally, e.g. of himself 402, his surroundings 404 or his pet dog "Toby" 406.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

It will be appreciated that the above embodiments have been described only by way of example. Other variants or implementations may become apparent to a person skilled in the art given the disclosure herein. For example, the invention could enable a voice or video call to be conducted using the secondary terminal to consume or generate at least one stream of the call whilst the first user terminal concurrently generates or consumes at least another stream of the call, or all stream(s) could be handled by the secondary terminal whilst the first terminal only controls the call. Further, the invention is not limited by any particular method of resource discovery or authorization, and any of the above-described examples could be used, or indeed others. Further, any of the first, second and/or third aspects of the invention may be implemented either independently or in combination. Where it is referred to a server this is not necessarily intended to limit to a discrete server unit housed within a single housing or located at a single site. Further, where it is referred to an application, this is not necessarily intended to refer to a discrete, stand-alone, separately executable unit of software, but could alternatively refer to any portion of code such as a plug-in or add-on to an existing application. The invention is not limited by the described embodiments but only by the appendant claims.

What is claimed is:

1. A method for use in a packet-based communication system for conducting video calls between a first user and a second user over a packet-based network the method comprising:
providing a first instance of a client application associated with the first user, the first instance of the client application enabling a first user terminal to access the packet-based communication system, the first instance of the client application being configured to determine an availability of one or more other, second user terminals, coupled to the packet-based communication system and installed with other instances of the client application associated with the first user, and to select one of the second user terminals; and
in response to the selection of the one of the second user terminals including a second instance of the client application, controlling the second instance of the client application by the first instance of the client application such that the selected second user terminal generates or consumes a second stream of the video call whilst the first user terminal concurrently generates or consumes a first stream of the video call;
wherein the first user is concurrently logged into both the first instance of the client application on the first user terminal and the second instance of the client application on the selected second user terminal and both the first instance of the client application on the first user terminal and the second instance of the client application on the selected second user terminal are associated with a common user name.

2. The method of claim 1, wherein the video call is conducted using the selected second user terminal to capture the second stream of the call whilst the call continues to be controlled by the client on the first user terminal.

3. The method of claim 2, wherein the control of said call by the client on the first user terminal comprises at least one of:
terminating the call, controlling a volume of the call, and selecting a media input or output type or transducer for the call.

4. The method of claim 1, wherein the first user terminal is used to initiate the call in the case of an outgoing call to the selected second user terminal or is used to answer the call in the case of an incoming call from the second user terminal.

5. The method of claim 2 further comprising, at a later time, relinquishing control of the call to the selected second user terminal in response to a further selection at the first terminal.

6. The method of claim 1, wherein the determining of the availability of one or more other, second user terminals comprises automatically discovering a respective identity of each of the one or more other second user terminals.

7. The method of claim 1, wherein the determining of the availability of one or more other, second user terminals comprises automatically discovering a respective address of each of the one or more other second user terminals.

8. The method of claim 1, wherein the determining of the availability of one or more other, second user terminals comprises automatically discovering a respective media capability of each of the one or more other second user terminals.

9. The method of claim 1, wherein the determining of the availability of one or more other, second user terminals comprises automatically discovering a respective online status of each of the one or more other second user terminals.

10. The method of claim 1, further comprising making said use of the selected second user terminal in conjunction with the first user terminal conditional on an authorization procedure.

11. The method of claim 1, wherein the first user terminal is a laptop or tablet computer and the selected second user terminal is a mobile handset.

12. The method of claim 1, wherein the selection of the second user selects the second user terminal having capabilities appropriate for handling the at least one stream of the call.

13. The method of claim 1, wherein the selecting of the second user terminal occurs after initiation of the video call using the first instance of the client application.

14. A computer program product comprising code embodied on a computer-readable storage device and configured so as when executed on a first user terminal to perform operations comprising:
providing a first instance of a client application associated with a first user, the first instance of the client application enabling the first user terminal to access a packet-based communication system to conduct video calls between the first user and a second user over a packet-based network;
determining an availability of one or more other, second user terminals, coupled to the packet-based communication system and installed with other instances of the client application associated with the first user;
selecting one of said second user terminals; and
in response to a selection of the one of the second user terminals including a second instance of the client application, controlling the second instance of the client application by the first instance of the client application such that the selected second user terminal generates or consumes a second stream of the video call whilst the first user terminal concurrently generates or consumes a first stream of the video call;
wherein the first user is concurrently logged into both the first instance of the client application on the first user terminal and the second instance of the client application on the selected second user terminal and both the first instance of the client application on the first user terminal and the second instance of the client application on the selected second user terminal are associated with a common user name.

15. The computer program product of claim 14, wherein the selection of the second user selects the second user terminal having capabilities appropriate for handling the at least one stream of the call.

16. The computer-readable medium of claim 14, wherein the code is further configured so as when executed on the first user terminal to select the second user terminal after initiation of the video call using the first instance of the client application.

17. A first user terminal comprising:
a transceiver operable to access a packet-based communication system to conduct video calls over a packet-based network; and
storage medium storing a first instance of a client application enabling the first user terminal to access the packet-based communication system; and
processing apparatus arranged to execute the first instance of the client application, the first instance of the client application being configured to determine an availability of one or more other, second user terminals, coupled to the packet-based communication system and installed with other instances of the client application, and to select one of the second user terminals; and the first instance of the client application being further configured to, in response to the selection of the one of second user terminals, including a second instance of the client application, control the second instance of the client application such that the selected second user terminal generates or consumes a second stream of the video call whilst the first user terminal concurrently generates or consumes a first stream of the video call;

wherein the first user is concurrently logged into both the first instance of the client application on the first user terminal and the second instance of the client application on the selected second user terminal and both the first instance of the client application on the first user terminal and the second instance of the client application on the selected second user terminal are associated with a common user name.

18. The first user terminal of claim 17, wherein the selection of the second user selects the second user terminal having capabilities appropriate for handling the at least one stream of the call.

19. The first user terminal of claim 17, wherein the first instance of the client application is further configured to select the second user terminal after initiation of the video call.

* * * * *